United States Patent
Basu et al.

(10) Patent No.: US 10,740,679 B1
(45) Date of Patent: *Aug. 11, 2020

(54) ANALYTICS SCRIPTING SYSTEMS AND METHODS

(71) Applicant: DATAINFOCOM USA, INC., Austin, TX (US)

(72) Inventors: Atanu Basu, Round Rock, TX (US); Frederick Johannes Venter, Driftwood, TX (US); Bruce William Watson, Kelowna (CA)

(73) Assignee: DatainfoCom USA, Inc., Austin, TX (US)

(*) Notice: Subject to any disclaimer, the term of this patent is extended or adjusted under 35 U.S.C. 154(b) by 1189 days.

This patent is subject to a terminal disclaimer.

(21) Appl. No.: 14/981,876

(22) Filed: Dec. 28, 2015

Related U.S. Application Data

(63) Continuation of application No. 13/673,551, filed on Nov. 9, 2012, now Pat. No. 9,230,211.

(51) Int. Cl.
*G06N 5/02* (2006.01)
*G06F 40/40* (2020.01)

(52) U.S. Cl.
CPC ............. *G06N 5/025* (2013.01); *G06F 40/40* (2020.01)

(58) Field of Classification Search
CPC combination set(s) only.
See application file for complete search history.

(56) References Cited

U.S. PATENT DOCUMENTS

| | | | |
|---|---|---|---|
| 6,876,988 B2 | 4/2005 | Helsper et al. | |
| 6,917,928 B1 | 7/2005 | Pellinat | |
| 7,373,633 B2 | 5/2008 | Kraiss et al. | |
| 7,979,380 B2 | 7/2011 | Moyne et al. | |
| 8,200,527 B1 | 6/2012 | Thompson et al. | |
| 8,209,218 B1* | 6/2012 | Basu et al. | 705/7.39 |
| 8,209,275 B2 | 6/2012 | Tsui et al. | |
| 8,214,308 B2 | 7/2012 | Chu | |
| 8,364,519 B1 | 1/2013 | Basu et al. | |
| 8,738,425 B1 | 5/2014 | Basu et al. | |

(Continued)

OTHER PUBLICATIONS

Predictive analytics in field service by Scott Brown, Atanu Basu and Tim Worth—Nov./Dec. 2010 (Year: 2010).*

(Continued)

*Primary Examiner* — Kakali Chaki
*Assistant Examiner* — Ababacar Seck
(74) *Attorney, Agent, or Firm* — Chad Peterson

(57) ABSTRACT

A method of determining a set of prescribed actions includes receiving a configuration script identifying a set of influencers, a set of performance indicators, a model type, a target time, and a prescription method. The method further includes deriving a model of the model type based on data associated with the set of influencers or with the set of performance indicators. The method also includes projecting a set of future influencer values associated with the set of influencers and projecting a set of future indicator values of the set of performance indicators at the target time using the model. The method can further include prescribing using the prescription method and based on projecting using the model a set of prescribed actions associated with the subset of actionable influencers. The method also includes displaying the set of prescribed actions.

20 Claims, 8 Drawing Sheets

(56) References Cited

U.S. PATENT DOCUMENTS

| | | | |
|---|---|---|---|
| 2001/0034628 A1 | 10/2001 | Eder | |
| 2002/0006192 A1 | 1/2002 | Bengtson et al. | |
| 2002/0013783 A1* | 1/2002 | Rising et al. | 707/102 |
| 2002/0049621 A1 | 4/2002 | Bruce | |
| 2002/0049687 A1 | 4/2002 | Helsper et al. | |
| 2002/0138303 A1* | 9/2002 | Enos et al. | 705/2 |
| 2003/0177060 A1 | 9/2003 | Seagraves | |
| 2004/0068429 A1 | 4/2004 | MacDonald | |
| 2004/0068431 A1 | 4/2004 | Smith et al. | |
| 2004/0138933 A1 | 7/2004 | LaComb et al. | |
| 2004/0148047 A1 | 7/2004 | Dismukes et al. | |
| 2004/0250255 A1 | 12/2004 | Kraiss et al. | |
| 2005/0004834 A1 | 1/2005 | Smith | |
| 2006/0010164 A1 | 1/2006 | Netz et al. | |
| 2006/0101017 A1 | 5/2006 | Eder | |
| 2006/0229921 A1* | 10/2006 | Colbeck | 705/7 |
| 2006/0242033 A1 | 10/2006 | Corbett | |
| 2006/0242035 A1 | 10/2006 | Corbett et al. | |
| 2007/0106593 A1 | 5/2007 | Lin | |
| 2007/0129893 A1 | 6/2007 | McColl et al. | |
| 2007/0150324 A1 | 6/2007 | Makita et al. | |
| 2008/0004922 A1 | 1/2008 | Eder | |
| 2008/0027769 A1 | 1/2008 | Eder | |
| 2008/0104104 A1 | 5/2008 | Nolan et al. | |
| 2008/0140623 A1 | 6/2008 | Tien et al. | |
| 2008/0183786 A1 | 7/2008 | Shimizu | |
| 2008/0195440 A1 | 8/2008 | Bagchi et al. | |
| 2008/0201397 A1 | 8/2008 | Peng et al. | |
| 2008/0243912 A1* | 10/2008 | Azvine et al. | 707/103 R |
| 2008/0294471 A1 | 11/2008 | Gupta et al. | |
| 2009/0064025 A1 | 3/2009 | Christ et al. | |
| 2009/0138334 A1 | 5/2009 | Henby et al. | |
| 2009/0319931 A1 | 5/2009 | Hutchings et al. | |
| 2009/0171879 A1 | 7/2009 | Bullen et al. | |
| 2009/0217183 A1 | 8/2009 | Moyne et al. | |
| 2010/0077077 A1 | 3/2010 | Devitt | |
| 2010/0114899 A1 | 5/2010 | Guha | |
| 2010/0274637 A1 | 10/2010 | Li et al. | |
| 2010/0332439 A1 | 12/2010 | Aciachi et al. | |
| 2011/0066457 A1 | 3/2011 | Chang et al. | |
| 2011/0071867 A1 | 3/2011 | Chen et al. | |
| 2011/0213644 A1 | 9/2011 | Phene | |
| 2011/0307327 A1* | 12/2011 | Bixby et al. | 705/14.43 |
| 2012/0331106 A1* | 12/2012 | Rannannurthy et al. | 709/218 |
| 2013/0036049 A1 | 2/2013 | Cacheria et al. | |
| 2013/0173493 A1 | 7/2013 | Chowdhary et al. | |
| 2013/0268260 A1* | 10/2013 | Lundberg et al. | 704/8 |
| 2014/0122389 A1* | 5/2014 | Riskin | 706/12 |

OTHER PUBLICATIONS

"Altaworks Selected by Industry Influencers to Demonstrate at DEMO 2002 Conference"; Business/Technology Editors; Business Wire; New York; Jan. 16, 2002; p. 1; Proquest.

"Fonterra Canpac Deploys Pavilion's Production Performance Management Solution: Fast Moving Consumer Goods Manufacturer Improves Operational Performance and Reduces Waste"; Business Wire; New York; May 23, 2006; p. 1; Proquest.

"Performance—Measurement & Small to Mid-sized Call Center Solutions"; Call Center Solutions; Mar. 1999: 17, 9; ProQuest Central; p. 22.

"Predictive Analysis with SQL Server 2008"; White Paper; Microsoft SQL Server 2008 R2; Nov. 2007.

Bauer; "Predictive Analytics: Data Mining with a Twist"; DM Review 15.12; Dec. 2005; p. 76.

Bauer; "Predictive Analytics: The Next Wave in KPI's"; DM Review; Nov. 2005.

Cheisa et al; "How do measurement objectives influence the R&D performancee measurement system design:"; Management Research News; 30(3); pp. 182-202; doi:10.1108/01409170710733269.

Colias; "New Statistical Tools for Key Driver Analysis"; Decision Analyst; 2007.

Fair Isaac Corp.; Decision Management Tools-Xpress OptiMIzer; Product Sheet; 2008; 2 Pgs.

Fair Isaac Corporation; "Predictive Analytics: Custom Insurance Analytics"; Product Sheet; 2008; 2 pages.

Frangopol et al.; "Probabilitic Performance Prediction of Deteriorating Structures Under Different Maintenance Strategies: Condition, Safety and Cost"; Apr. 2004.

Holland; "Achieving a step change in contact centre performance: Exploiting data to make better decisions and take effective action"; Journal of Targeting, Measurement and Analysis for Marketing, vol. 12, 2, pp. 103-113.

Keeley; "Root Cause Analysis Research Corner Cause and Effect"; Call Center Magazine; Mar. 2005.

Lawson et al; "Socrecards and dashboards-partners in performance"; CMA Management; Dec./Jan. 2007.

Loucks; "Model Sensitivity and Uncertainty Analysis"; Water Resources Planning and Management; UNESCO; 2005; http://ecommons.library.cornell.edu/bitstream/1813/2804/12/09_chapter09.pdf.

Marr; "Measuring and managing intangible value drivers"; Business Strategy Series; 8(3); 2007; pp. 172-178.

Palfreyman;"Performance Indicators and Reporting: Some practical guidelines"; 1998; Charter. 69 (4), pp. 85-86.

SAS Institute Inc., "How to Compete on Analytics: The Analyitical Center for Excellence"; White Paper; 2008; 18 pages.

SAS Institute Inc., Ngenera Corporation, and Intel; "Sucessful Automating Decisions with Business Analytics; How to Identify High-Value Opportunities for Embedding Analytics into Your Business Processes"; White Paper; 2008; 22 pages.

SAS Institute Inc.; Enhancing Sales and Operations Planning with Forecasting; White Paper; 2008; 14 pages.

SAS Institute: "Data Driven Decision Making: Analyzing Your Data to Improve Student Learning"; White Paper; 2008; 19 pages.

SAS Institute; "Data Management for Risk: The Importance of Data for Effective Risk Management"; White Paper; 2009; 11 pages.

SAS Institute; "The SAS Enterprise Intelligence Platform: SAS Business Intelligence; Enabling BI Consolidation and Standardization Without Comprises"; White Paper; 2008; 13 pages.

SPSS Inc.; Clementine® 12.0 Specifications; "Achieve Better Insight and Prediction with Data Mining"; Product Specification; 2008; 6 pages.

SPSS Inc.; "Get More Out of Your Analyitical Investment"; Advertisement; 2008; 2 pages.

Wen et al.; "Utilizing the Balanced Scorecard for Performance Measurement of Knowledge Management"; Journal of Accounting, Finance & Management Strategy, 3(2), pp. 39-58.

Bachrach A. et al.; "Microsoft SQL Server 2012"; Technical White Paper; Mar. 2012; pp. 1-20.

Brown, Scott et al.: "Predictive analytics in field service"; AnalyticsMagazind.com; Nov./Dec. 2010; pp. 23-30.

Evans, J. et al.: "Business Analytics: The Next Frontier for Decision Sciences"; Decision Science Institute; Mar. 2012; 4 Pgs.

Myers, P. et al.; "Introducing the BI Semantic Model in Microsoft SQL Server 2012"; SQL Server Technical Article; Oct. 2012; pp. 1-18.

* cited by examiner

ANALYTICS SCRIPTING SYSTEMS AND METHODS

CORRESPONDING APPLICATION(S)

This application is a continuation application of U.S. patent application Ser. No. 13/673,551, filed Nov. 9, 2012, which is incorporated herein by reference in its entirety.

FIELD OF THE DISCLOSURE

This disclosure, in general, relates to systems and methods for performing data analysis, prediction, and prescription using scripting.

BACKGROUND

Industry is increasingly relying on analytics and prediction systems to predict events and business outcomes. With these predictions, businesses hope to preempt problems and improve business performance. However, such analytics systems are becoming increasingly complex, limiting usability by managers.

In particular, subprocesses within the analytics system, such as data preprocessing and modeling, utilize complex algorithms and techniques, each using a variety of parameters and factors that influence functionality. For example, industry is increasingly turning to unstructured data sources that are preprocessed using a variety of interpreters and algorithms, each utilizing a different set of parameters and providing a different output.

As such, the complexity of conventional analytics systems often prevents use of such systems by business management. Further, the expense associated with using expert labor to perform analysis and yield predictions leads to less frequent use and lowers the cost effectiveness of such systems.

SUMMARY

In a first aspect, a method of determining a set of prescribed actions includes receiving from a user a configuration script identifying a set of influencers, a set of performance indicators, a model type, a time granularity, a target time, and a prescription method. The method further includes, using a modeling module, deriving a model of the model type based on data associated with the set of influencers and data associated with the set of performance indicators. The model associates the set of influencers with the set of performance indicators. The set of influencers includes a subset of actionable influencers. The method also includes, using a prediction module in communication with the modeling module, projecting a set of future influencer values associated with the set of influencers and projecting a set of future indicator values of the set of performance indicators at the target time using the model derived by the modeling module. The set of future influencer values has the time granularity. The method can further include, using a prescription module in communication with the prediction module, prescribing using the prescription method and based on projecting using the model a set of prescribed actions associated with the subset of actionable influencers. The set of prescribed actions has the time granularity. The method also includes displaying the set of predicted influencer values, the set of future indicator values of the set of performance indicators and the set of prescribed actions at the target time.

In a second aspect, a method of determining a set of prescribed actions includes receiving from a user a configuration script identifying a set of influencers, a set of performance indicators, a constraint associated with a constrained influencer of the set of influencers, a model type, a granularity, a target time, a prescription method, and an objective. The method further includes, using a modeling module, deriving a model of the model type based on data associated with the set of influencers and data associated with the set of performance indicators. The model associates the set of influencers with the set of performance indicators. The set of influencers includes a subset of actionable influencers. The method also includes, using a prediction module in communication with the modeling module, projecting a set of future influencer values associated with the set of influencers and projecting a set of future indicator values of the set of performance indicators at the target time using the model derived by the modeling module. The set of future influencer values has the granularity. In addition, the method includes, using a prescription module in communication with the prediction module, prescribing using the prescription method, based on the objective and based on projecting using the model subject to the constraint, a set of prescribed actions associated with the subset of actionable influencers. The set of prescribed actions has the granularity. The method also includes displaying the set of prescribed actions.

In a third aspect, a method of determining a set of prescribed actions includes receiving from a user a configuration script identifying a data source, an interpretation method associated with the data source, a set of influencers, a set of performance indicators, a constraint associated with a constrained influencer of the set of influencers, a model type, a granularity, a target time, a prescription method, and an objective. The method also includes, using a preprocessing module, preparing a portion of the data associated with the set of influencers or a portion of the data associated with the set of performance indicators using the data source based on the interpretation method associated with the data source. The method further includes, using a modeling module, deriving a model of the model type based on the data associated with the set of influencers and the data associated with the set of performance indicators. The model associates the set of influencers with the set of performance indicators. The set of influencers includes a subset of actionable influencers. The method also includes, using a prediction module in communication with the modeling module, projecting a set of future influencer values associated with the set of influencers and projecting a set of future indicator values of the set of performance indicators at the target time using the model derived by the modeling module. The set of future influencer values has the granularity. In addition, the method includes, using a prescription module in communication with the prediction module, prescribing using the prescription method, based on the objective and based on projecting using the model subject to the constraint, a set of prescribed actions associated with the subset of actionable influencers. The set of prescribed actions has the granularity. The method also includes displaying the set of prescribed actions.

In a fourth aspect, a computational system includes storage comprising a configuration script accessible by a modeling module, a prediction module, and a prescription module. The configuration script identifies a set of influencers, a set of performance indicators, a model type, a prediction time, and a prescription algorithm. The computational system further includes the modeling module to receive data associated with the set of influencers and data associated with the set of performance indicators and to derive a model of the model type associating the set of the influencers with the set of performance indicators and the prediction module communicatively coupled to the modeling module to receive the model associating the set of influencers with the set of performance indicators. The prediction module is to provide future indicator values associated with the set of performance indicators at the prediction time based on a set of influencer values associated with the set of influencers. The set of influencer values includes a set of present influencer values associated with the set of influencers and includes a projected set of future influencer values associated with the set of influencers. The computational system further includes the prescription module communicatively coupled to the prediction module to receive the future indicator values associated with the set of performance indicators and the set of influencer values associated with the set of influencers. The prescription module is to prescribe a set of prescribed actions based on prescription algorithm.

In a fifth aspect, a computational system includes storage comprising a configuration script accessible by a preprocessing module, a modeling module, a prediction module, and a prescription module. The configuration script identifies a data source, a processing method associated with the data source, a set of influencers, a set of performance indicators, a model type, a prediction time, a prescription algorithm, and an objective. The computation system further includes the preprocessing module to determine at least a portion of data associated with the set of influencers or at least a portion of data associated with the set of performance indicators based on a data source in accordance with the processing method. The computation system also includes the modeling module to receive the data associated with the set of influencers and the data associated with the set of performance indicators and to derive a model of the model type associating the set of the influencers with the set of performance indicators. The computation system further includes the prediction module communicatively coupled to the modeling module to receive the model associating the set of influencers with the set of performance indicators. The prediction module is to provide future indicator values associated with the set of performance indicators at the prediction time based on a set of influencer values associated with the set of influencers. The set of influencer values includes a set of present influencer values associated with the set of influencers and includes a projected set of future influencer values associated with the set of influencers. The computation system also includes the prescription module communicatively coupled to the prediction module to receive the future indicator values associated with the set of performance indicators and the set of influencer values associated with the set of influencers. The prescription module is to prescribe a set of prescribed actions based on prescription algorithm and the objective.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
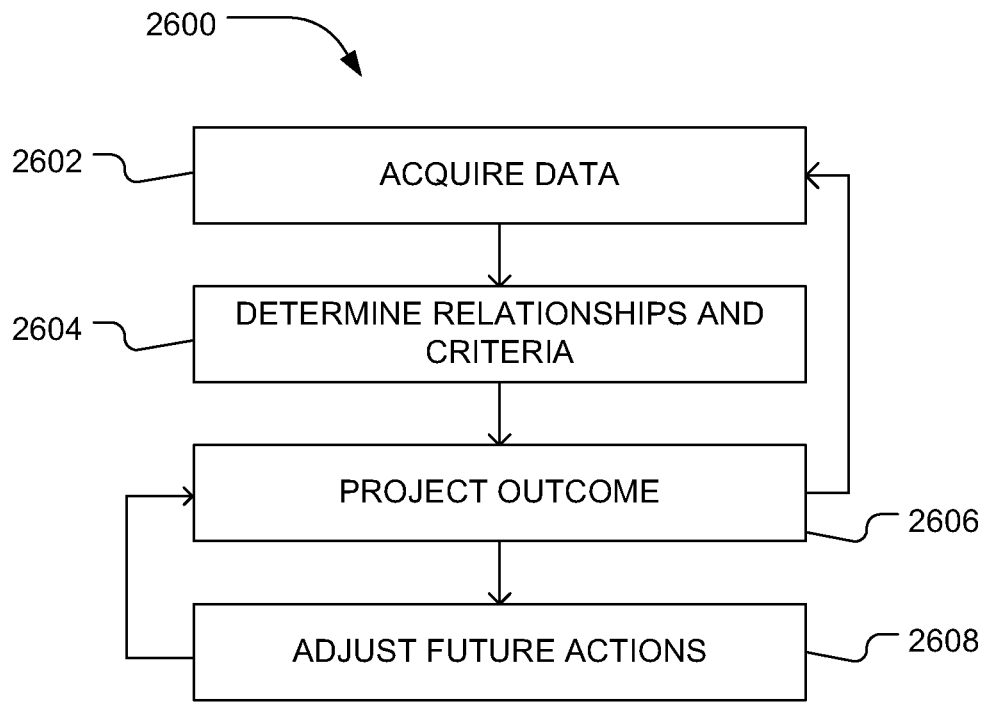
FIG. 1 includes a flow diagram illustrating an exemplary process.

In an embodiment, an analytics system includes several subsystems and a configuration script to configure aspects of the subsystems. The subsystems can include a preprocessing subsystem, an insight or modeling subsystem, a prediction subsystem, a prescription subsystem, or a combination thereof. The configuration script can include elements relevant to the configuration of several of the subsystems and can include elements to specifically configure individual subsystems. In an example, the configuration script can identify variables, such as influencers and performance indicators, used by several of the subsystems. In addition, the configuration script can identify specific parameters, processes, or data useful by a particular subsystem. Such an analytics system is particularly adapted for Prescriptive Analytics® techniques. In particular, such an analytic system can be used to prescribe actions, such as actions at future times useful for achieving performance goals. Further, associated methods and systems can be used to provide a Decision-as-a-Service™ software and online services to assist business entities achieve a desired performance.

In particular, the analytics system and methods can be used to implement Prescriptive Analytics® techniques that assist with determining future actions or decisions in view of business rules and projected outcomes. The methods can be embodied in executable instructions, processors or systems to execute such instructions, interfaces implemented by such systems, media storing such executable instructions, and services derived from the use of such methods and systems. In addition, the methods can be utilized to provide Predictive Decision Management® information and services, such as Decision-as-a-Service™ services. In particular, the methods can implement predictive analysis, such as forecasting to project what will happen and when. Further, the methods can implement optimization, scenario testing, and root cause analysis of factors that influence performance.

In an embodiment, a system predicts problems that can occur, providing an indication of both the nature of the problem and when it is expected to occur. The problems can be expressed as deviations in performance indicators that violate business criteria. For example, a problem can be expressed as the value of a performance indicator crossing a threshold. In addition, the system supports testing of solutions to the predicted problem. The solutions are expressed in terms of what action to take and when to take such action. As such, the system assists with determining a desirable set of future actions to maintain a business process in compliance with business criteria. Deviations from performance indicators that violate business criteria can also include opportunities from which the business can benefit. For example, when a future customer satisfaction score exceeds a threshold, the business can decide to reduce its service level and thus, reduce cost.

Businesses rely on business processes to function. Evaluating how well that business process is performing allows a business to allocate resources, increase production, improve its position in the market place, increase profitability, or any combination thereof. For example, a business process can include a call center, the function being customer service or technical support. In another example, the business process can include field services, the function being product installation or repair. In a further example, the business process can be a marketing department, the function being to control public perception of the business or a response rate. In additional examples, the business process can include transactions services, finance and accounting, manufacturing, logistics, sales, or any combination thereof.

In particular, evaluation of the business process can be correlated with performance indicators (PIs). One or more performance indicators (PIs) can be used to quantify how well a business process is performing. For example, a call center can quantify performance using performance indicators, such as customer satisfaction, problem resolution, productivity indicators, cost indicators, or any combination thereof.

Once determined, the performance indicators (PIs) can be compared with business criteria to determine whether the business process is performing as desired. For example, a business criterion can include threshold values, limits on rates of change, heuristics associated with aspects of the business function or any combination thereof. For example, the performance indicator (PI) can be compared to a threshold value to determine whether the performance indicator (PI) is within a desired range or is in violation of the threshold, indicating poor performance or an unnecessary high performance.

The performance indicators (PIs) are influenced by other factors associated with performing the business process. In particular, such factors are referred to as influencers and influencers correlate with the performance indicators. For example, an influencer associated with call center performance can include the number of contacts made with a customer to resolve an issue, the type of issue, hold time, shipping delays, or any combination thereof, among others. Such influencers can, for example, influence performance indicators, such as customer satisfaction and brand satisfaction. Performance indicators (PIs) or influencers can be of numerical (continuous or integer) nature, categorical nature, or a combination thereof. Further, the PIs or influencers can be ordered or can be non-ordered. In another example, the distributions of performance indicators (PIs) or influencers are utilized or predicted. In particular, a PI distribution provides data about the underlying nature of the median or mean value. For example, when the PI relates to customer satisfaction, an average value does not provide information about the number of dissatisfied customers. An average of 80% satisfaction can be the result of all participants having a satisfaction near 80% or can be the result of several 100% satisfied customers and a few very dissatisfied customers. Identifying the existence and then cause of the few very dissatisfied customers can provide greater benefit than seeking to achieve an average value. In the case of categorical performance indicators (PIs) or influencers, such a prediction can include the prediction of the occurrence set of categories. As used below, the term "value" is used to include numerical values, categorical values, or any combination thereof.

The influencers and the performance indicators (PIs) change over time. The change can be caused by the change of influencers or by a time dependency of a performance indicator on itself. As such, the performance indicator (PI) can deviate overtime and violate business criteria, which is indicative of a problem in the business unit or low performance. To correct the deviation, associated influencers can be manipulated. For example, more staff can be added to reduce hold time. However, immediate manipulation of the influencers to solve a problem predicted in the future can provide less than desirable solutions to the problems in the business process. For example, hiring more staff long before the hold times are expected to increase leads to higher cost in the call center. The present system can assists with determining a desirable set of future actions to maintain a business process incompliance with business criteria.

In an embodiment, the present system performs a method to determine such a desirable set of future actions. For example, FIG. 1 illustrates a method 2600, which includes acquiring data (2602), determining relationships and criteria (2604), predicting outcomes (2606) and adjusting future actions (2608). The present system can acquire data, as illustrated at 2602, from a variety of sources. The data can be acquired from external sources. Exemplary external sources include databases, customer service logs, surveys, testing, or any combination thereof, among others. In particular, the data can be derived from structured sources. In another example, the data can be derived from unstructured sources. The data can be transformed and aggregated. In addition, the data can be cleaned. The resulting data can be stored in a data management system.

In an example, the system can also use streaming data sources where there is no intermediate data management system for the storage of aggregated data. Such a system is especially useful for big unstructured data sets (terabyte data) where the use of a rational database management system would be inefficient or economically unacceptable. In such an example, techniques such as Map/Reduce are applied based on Big Data processing systems like Apache Hadoop.

Once clean aggregated data is available, relationships between performance indicators and potential influencers can be determined and criteria for performance can be established, as illustrated at 2604. Such relationships permit projection of potential outcomes, which can be compared with the criteria to determine whether the business process is functioning well. In particular, the relationships can identify influencers that have a greater influence on one or more performance indicators.

As illustrated at 2606, outcomes can be projected. Projecting can include predictive analysis to determine what is to happen. Predictive analysis can include forecasting to determine what is to happen and in what time frame. In particular, such projection can include projecting the value of one or more performance indicators based on the determined relationships and expected values of influencers. In a further example, the future values of one or more influencers are projected, and the performance indicators are determined based at least in part on the future values of the one or more influencers. Projecting, and in particular, forecasting can be performed using an algorithm constrained with business rules. For example, the values of influencers or performance indicators can be constrained based on rules established by the business. In an example, one or more of the performance indicators are projected to violate one or more business criteria at future times. For example, the value of a performance indicator can cross a threshold at a future time step. In this way, the business process is provided with warning about a potential problem that may arise in the future.

The present system can also permit adjustment of future actions, as illustrated at 2608. For example, to determine a solution to a projected problem, the system can adjust, in an automatic mode or through manual adjustment, the future value of one or more influencers. The performance indicators can be projected using the adjusted influencer values to determine whether the problem is solved. In particular, the adjustment to influencer values can be made at one or more future time steps. As such, minor adjustments to an influencer value can be made during a series of time steps. In another example, a large adjustment can be made at a single time step closer to the projected violation of the business criteria. The process can be iterated to determine a particularly advantageous set of future actions that maintain the performance indicators at desired states. In particular, a performance indicator can be optimized by adjusting one or more values of the influencers. As used herein, optimizing is a process of adjusting values to meet or approach a criterion. Further, the process can be constrained based on business rules. For example, business rules can set boundaries to the values of influencers or performance indicators.

In addition, the future actions and data derived therefrom can be used to recalibrate the system. For example, new results relating actions taken can be used to inform the algorithm and for selection of an algorithm. Other processes, such as iteratively adjusting or optimizing or root cause analysis, can be performed automatically or continuously in response to new data.

Figure 2:
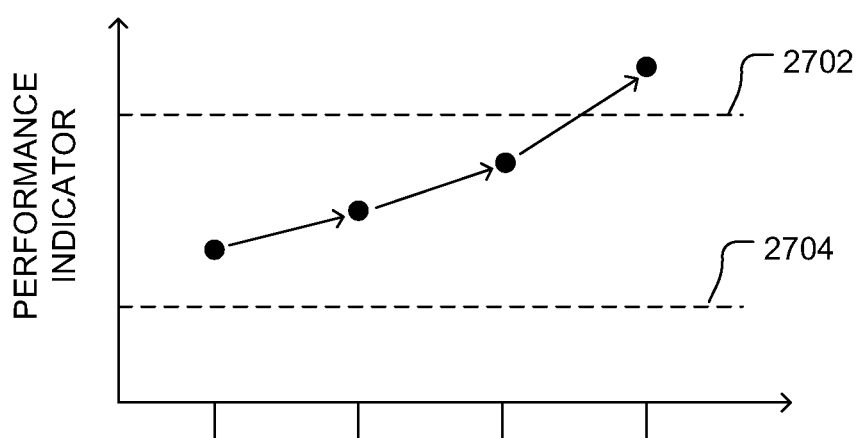
FIG. 2 includes a graph illustration of an exemplary relationship between a performance indicator and time.

To conceptually illustrate the iterations to determine a desirable set of future actions to maintain a business process in compliance with business criteria, FIG. 2 includes a graph illustration of the relationship between the value of a performance indicator and time. As illustrated, with each step in time, the value of the performance indicator changes. At the fourth time step, the value of the performance indicator violates a business criterion. The business criterion is illustrated as a threshold 2702. When the value of the performance indicator extends above the threshold 2702 or is below the threshold 2704, the performance indicator has violated business criteria. Alternatively, the business criteria can be expressed as limits to a rate of change. In another example, the thresholds can have difference values at different times.

Figure 3:
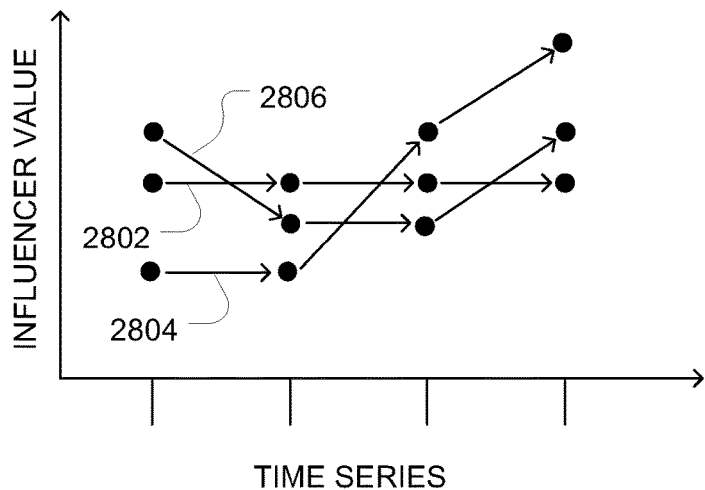
FIG. 3 includes a graph illustration of exemplary relationships between the value of influencers and time.

FIG. 3 illustrates expected influencer values over time. To more easily visualize a comparison, the values can be normalized. While a multiline chart is used to illustrate FIG. 3 for conceptual purposes, the influencer values can include categorical values, numerical values, or any combination thereof. For example, an influencer 2802 can have constant values at each of a series of time steps. In another example, an influencer 2804 can have values that increase with each subsequent time step. Alternatively, the value of an influencer can fluctuate with each time step. For example, an influencer 2806 can decrease in a first time step and increase at a subsequent time step. While the values of three exemplary influencers are illustrated, influencer values can be projected to increase, decrease, or remain the same with each time step in the time series.

In particular, the influencer values or categories can be projected based on known factors and prior history. For example, if call volume or hold time are considered influencers of customer satisfaction in a call center, it may be projected, based on past experience, that call volume and hold time increase during holiday seasons. In a field service process for a heating and air conditioning company, service calls can increase during summer months in Southern regions and increase in winter months in Northern regions. As such, embodiments of the present system can utilize manually set values of influencers, projected values of influencers, or any combination thereof.

Figure 4:
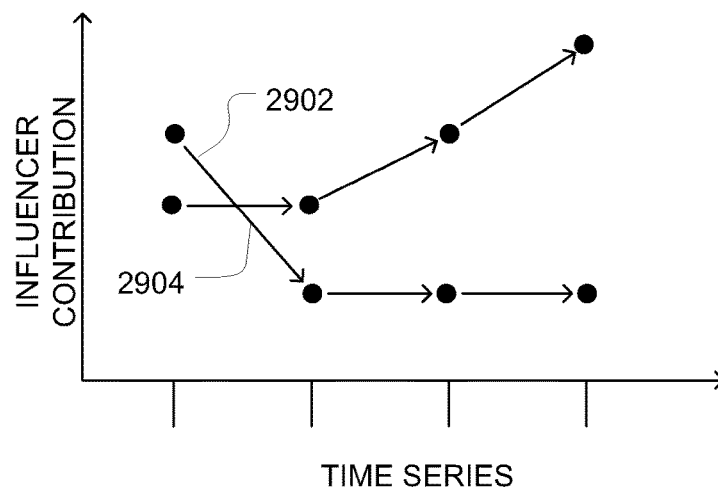
FIG. 4 includes a graph illustration of exemplary relationships between time and the contribution of an influencer to the value of a performance indicator.

Each influencer can contribute to the projected value of one or more performance indicators and each performance indicator can be a function of one or more influencers and time. In particular, determining the relationship of influencers and performance indicators includes determining the contribution of each influencer to the value of a projected performance parameter. Such conceptual contributions are in practice a model derived from data and relevant algorithms. FIG. 4 illustrates conceptually the contribution of two influencers to a projected performance indicator. In addition to the value of the influencer, the value of the performance indicator can be influenced by how much a particular influencer influences the value of the performance indicator at future time steps. For example, the contribution of an influencer 2902 to the value of a performance indicator can decrease over time. As illustrated, the value of influencer 2902 contributes significantly to the current value of the performance indicator. However, the value of the influencer 2902 contributes less to projected values of the performance indicator. In such an example, the influencer 2902 may not correlate with future values of the performance indicator. In contrast, the contribution of an influencer 2904 to the value of a performance indicator increases at subsequent time steps. For example, the value of the influencer 2904 can correlate strongly with the value of the performance indicator at a future time step.

Using the influencer values or categories, whether projected or manually set, and using the relationships of such influencer values or categories on future values of the performance indicator, the system can project performance indicator values or categories over a series of future time steps and iteratively adjust the influencer values or the occurrence of categories at future time steps to determine desirable changes to influencer values or categories at future time steps that maintain the performance indicators in balance with the business criteria.

Figure 5:
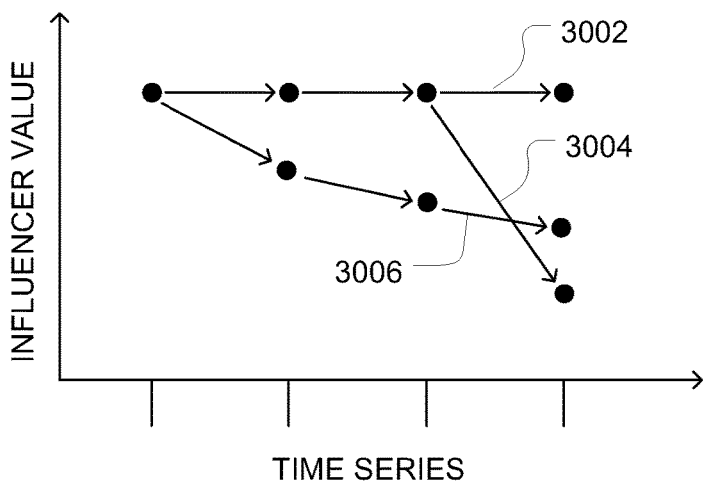
FIG. 5 includes a graph illustration of exemplary changes to the value of an influencer projected over time.

For example, FIG. 5 includes an illustration of sets of changes that can be made to the values of an influencer through a time series. In an example, the value of the influencer can be constant through time, as illustrated at 3002. Such a path (set of consecutive values of an influencer) can lead to a violation of a business criterion by performance indicators. To prevent violation of the business criterion, the influencer can be decreased at at least one future time step. For example, at a third time step the influencer can be reduced significantly, as illustrated at 3004, to prevent a violation. In another example, the influencer can be gradually reduced over a series of time steps, as illustrated at 3006. As such, different paths or sets of changes to an influencer value can be assessed to determine a preferred path that maintains the business process in compliance. In an example, such a path can be preferred because it is a lower cost solution or has advantages not present with other paths.

As such, embodiments of the present system can assist with determining a set of future actions (changes to influencers) that maintain a business process, as quantified by performance indicators, in compliance with business criteria. In other words, the present system can assist with determining which changes to make to a business process and when to make such changes.

Figure 6:
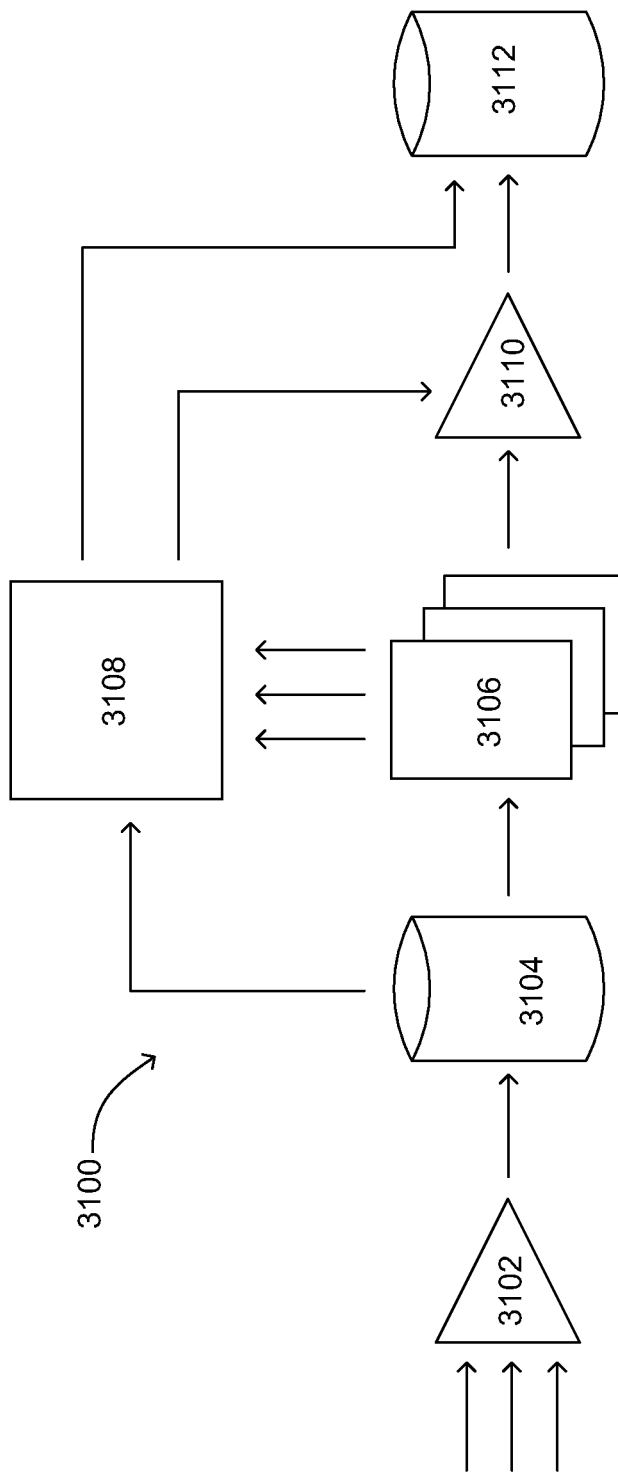
FIG. 6 includes an illustration of an exemplary process for predictive decision making.

In an embodiment illustrated in FIG. 6, a system 3100 includes tools 3102 for processing raw data gathered from external sources. For example, the tools 3102 can assist with loading data from external sources, transforming the data into desirable formats, aggregating the data, and cleaning the data.

In particular, the data can be derived from structured sources, such as databases, tables, listings, or any combination thereof. In another example, the data can be derived from unstructured sources. Unstructured sources are sources that are interpreted using human or artificial intelligence and, for example, include video sources, audio sources, narrative text, or any combination thereof. Narrative text includes, for example, articles, blogs, emails, and other writings in prose, such as those available via the internet or electronic sources. Further, unstructured sources can include documents having narrative text and including enriched formatting, such as tags. For example, the unstructured source can include a narrative text document formulated in a hypertext, XML or tagged format. Once processed, the data is stored, for example, in a data management system, such as a database 3104.

The data and a set of algorithms 3106 can be used to prepare models. Algorithms 3106 can take the form of heuristics or the form of algorithms to form regression models, Markov chains, time series models, state space models, Bayesian models, neural networks, or any other appropriate model, or any combination thereof. In particular, exemplary algorithms 3106 include autoregressive integrated moving average (ARIMA), seasonal ARIMA (SARIMA), autoregressive conditional heteroskedasticity (ARCH), or generalized autoregressive conditional heteroskedasticity (GARCH), among others. The data can be applied though the algorithms 3106 to provide relationships and models between influencers and performance indicators, which can be validated against a test set from the original data, at validation 3108. Validation 3108 results can be used by selector 3110 to select a preferred model 3106. The model is assembled and stored in a model management system 3112, through which performance indicators can be projected and desirable paths of influencer values determined.

Once prepared, embodiments of the present system can apply new external data, in addition to existing data, to project the values of influencers and performance indicators. A user can configure the system, establishing, for example, a period over which projects are to be made, and other parameters associated with the system. In addition, embodiments of the system can assist with ranking a set of influencers based on their contribution to a particular performance indicator. A small change in a high ranking influencer can have a greater effect on a performance indicator than a large change in a low ranking influencer. Such a ranking can be used to perform root cause analysis. Further, the system can be tested for accuracy based on the model. The ranking can be displayed on a display device.

Figure 7:
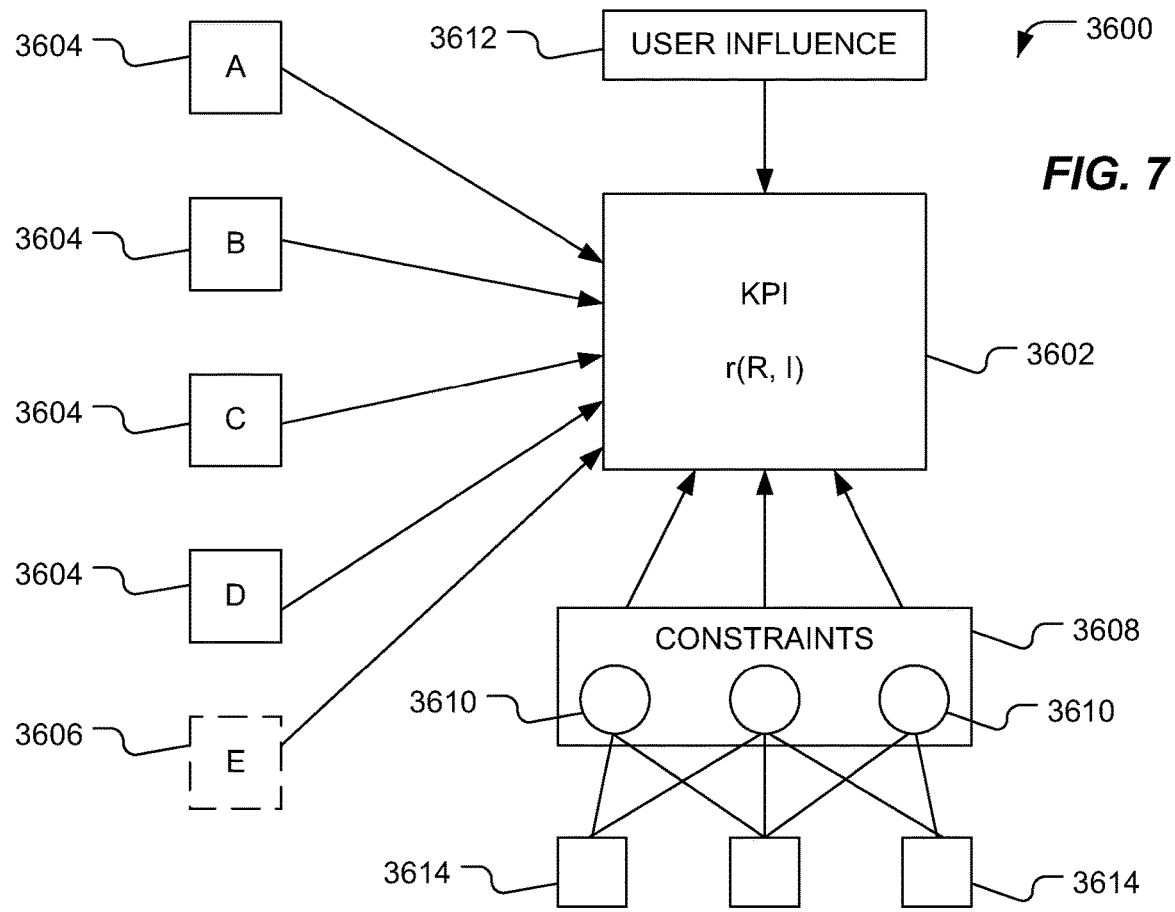
FIG. 7 and FIG. 8 include illustrations of exemplary methods for determining key performance indicator values.

In further explanation of a system 3600, key performance indicators 3602 are influenced by influencers 3604 as constrained by constraints 3608, as illustrated in FIG. 7. Further, a user 3612 can influence the relationships established between constraints (R) and influencers (I). For example, a user can select parameters, a type of model, or other factors that influence how a relationship (r) is established between the influencers 3604, the constraints 3608, and the KPI 3602. In an example, the user 3612 can influence the system through a user interface or by using a configuration script.

Such a relationship (r) permits the determination of the KPI 3602 at one or more future time periods based on present and future values of influencers 3604 subject to constraints 3608. In addition, such a relationship (r) is useful for determining the influence of changes in the influencers 3604 on the KPI 3602 at a selected future time. As a result, root cause analysis can be performed specifically for the selected future time or generally across time periods. In addition, the system can automatically or iteratively determine a set of actionable tasks including changes to influencer values over time to provide future KPI values 3602 that do not violate business rules, subject to constraints 3608. A business rule can be a constraint. Alternatively, a business rule can be different than a constraint. In a further example, a user can manipulate one or more future values of a selected influencer 3604 to determine the effect on the future value of a key performance indicator.

The constraints 3608 can take a variety of forms including box constraints, functional constraints, quantized constraints, step constraints or any combination thereof. The constraint may not be static over time. In particular, the system can indicate that a constraint is to be changed based on auxiliary data. As a result, a constraint can evolve over time, providing an indication of new business rules or a new paradigm discovered through data provided to the system. For example, a range associated with a box constraint can be changed when a value of the KPI or an influencer is frequently in violation of limits of a box constraint. Such sticking to an upper or lower constraint can indicate that a more optimal solution is found in a different range of the influencer value. When the constraint is a function, the form of the function or the parameters associated with the function can change over time as data is provided to the system. Such constraints can also be a relationship based on business rules and performance indicators. In an additional example, a constraint can limit the range of an associated influencer based on the temporally adjacent values of the associated influencer. In an example, constraints 3610 are each influenced by external data 3614. As external data is provided to the constraints 3610, constraints can change or can provide a user with an indication that the constraint should be reconsidered. In such a manner, new business rules can be discovered, preconceived notions of doing business can be reevaluated, and adjustments to the constraints can be considered.

Determining whether to change a constraint or other rules within the system can be performed utilizing meta-rules. Meta-rules can apply a generalize rule to constraints based on the type of constraint or the behavior of data associated with the constraint. For example, when a prescribed influencer is at the top or the bottom of a box constraint for a set number of times, the system can indicate that the constraint should be reconsidered. In another example, when an influencer exhibits erratic changes providing a high variance in influencer values, the absence of a constraint or a preference for reconsidering constraints can be indicated. In such a manner, business rules and other constraints can be adaptive, compensating for changes in a business environment.

In a further example, analysis by user 3612 can influence the nature of the relationship. Using techniques, such as Bayesian networks, can indicate whether additional influencers should be included in the relationship (r). For example, analysis of the system can indicate that an additional influencer 3606 should be provided to establish a relationship (r) for determining future KPI values. As such, the system can assist with building a relationship model, selecting appropriate influencers, and introducing or removing influencers as a business environment changes or the influencers lose influence on the KPI.

Figure 8:
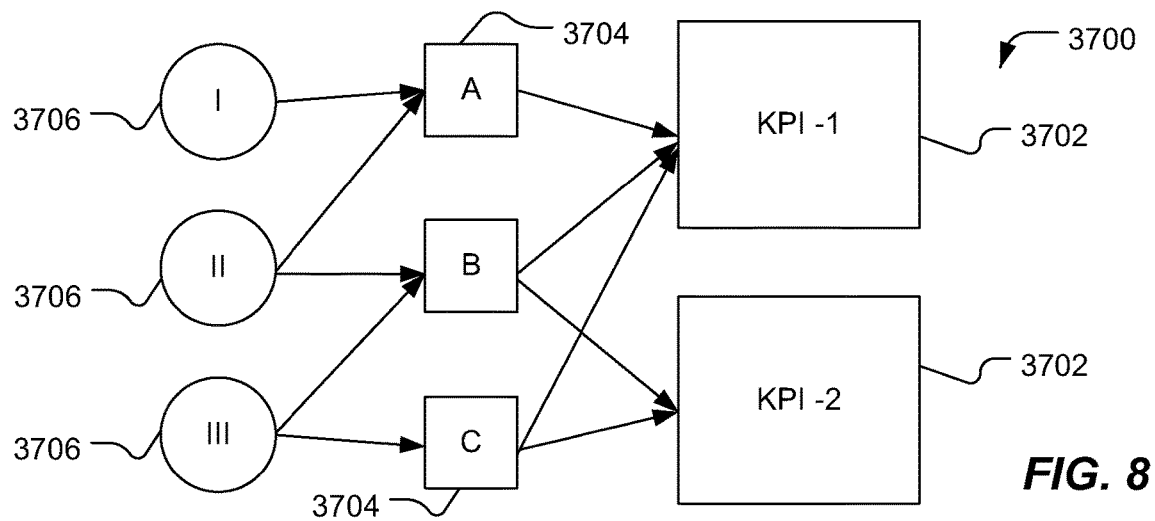

Such networks can be further utilized to translate actions 3706 into influencers 3704 that are used in relational models to determine values of the performance indicators 3702, as illustrated at FIG. 8. In particular, exemplary action hierarchies can combine user actions 3706 into differing influencers 3704 that provide relationships for determining future values of key performance indicators. In this way, the system 3700 can provide a way of translating actionable business actions to future values of key performance indicators using intermediary influencer values. When influencer values are determined for a future actionable pathway, actions 3706 can be determined from influencers 3704 and implemented by a user.

The future value of an influencer can also be limited by values of temporally neighboring future values. For example, an influencer at a first future time can limit the value of the influencer at a second future time. Such a limit can be expressed based on step limits (e.g., maximum permissible change). In another example, the limit can be expressed as a function of time. For example, limits on the value of an influencer can change based on time, either relative or according to a calendar.

When limits to influencer values are a function of time or other influencer values, optimization to achieve a desired key performance indicator value can take longer to implement. Limits to influencer or indicator values that are a function of time or other influencer or indicator values are referred to herein as "functors." For example, when an influencer value is functionally constrained based on time, changing the value of the influencer to a substantially optimal value can be prevented until the functional constraint permits the influencer to have the substantially optimal value.

In a further example, the relationships for predicting the KPIs can be recalibrated. In particular, a trigger rule can be evaluated when new data is received. For example, a predicted value of a KPI can be compared to an actual value and when the difference is significant, such as beyond a threshold, recalibration can be triggered.

Recalibration can include adjusting parameters of a model based on new data. The system can also determine that the previous model no longer reflects the relationships between influencers and performance indicators. A model can be restructured to better reflect the relationships. In another example, a new influencer can be added to the model. In a further example, a new type of algorithm or model can be selected and the parameters determined for the new type of algorithm or model based on the new data and past data. Once recalibration is performed, the system can provide an updated prediction, root-cause analysis, or prescription.

Further, the system can provide a warning when suggested actions are not implemented. For example, when the system predicts that a future value of a key performance indicator will be in violation of a business rule and prescribes an action and when new data indicates that the action was not implemented and the key performance indicator will be in violation of the business rule, the system can provide an indication or send a message to a supervisor indicating that the actions were not taken. For example, an indication can be displayed on an interface device, sent via email, sent as a text message, or provided as a voicemail.

Such analytics and prescriptive methods can be implemented by analytics system. In particular, the analytics system may include one or more interfaces, one of which being a configuration script. The configuration script can be used to at least partially configure the analytics system in preparation for analysis and prescription processing.

Figure 9:
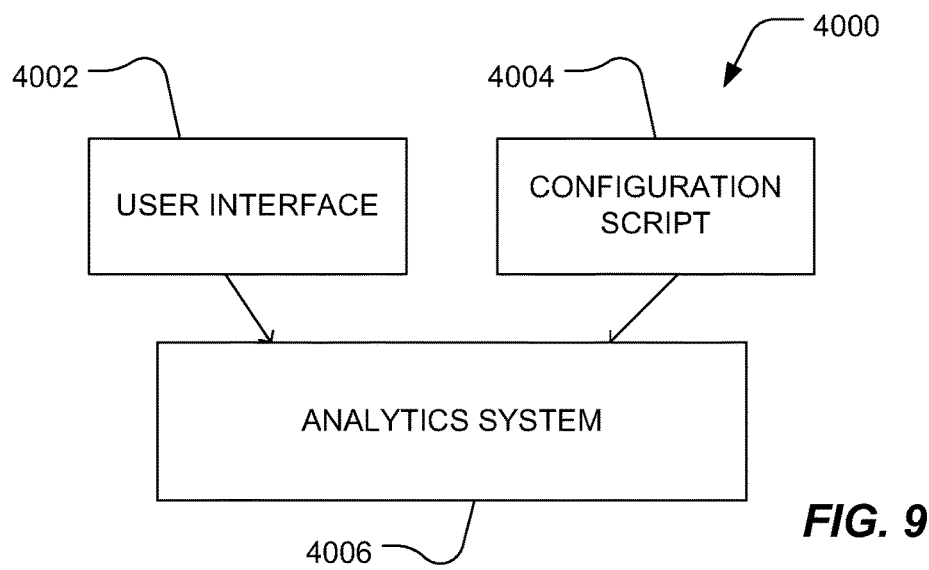
FIG. 9 includes an illustration of exemplary system including inputs into an analytic system.

For example, FIG. 9 illustrates a system 4000 that includes an analytics system 4006. The analytics system 4006 is in communication with a configuration script 4004. In addition, the analytics system 4006 may be in communication with a user interface 4002. Optionally, the user interface 4002 can be used to configure the analytics system 4006. The configuration script 4004 can be used to configure several subsystems of the analytics system 4006 with information relevant to each of the configured subsystems. In addition, the configuration script 4004 can include specific information to configure individual subsystems. For example, the configuration script 4004 can establish variables. Such variables can include influencers and performance indicators. Each of the subsystems of the analytics system 4006 can utilize the influencers and performance indicators as identified in the configuration script 4004 as part of their respective configurations. In another example, the configuration script 4004 can identify models and algorithms, as well as associated parameters, to be used by a particular subsystem of the analytics system 4006. Further, the configuration script 4004 can identify constraints, functors, thresholds, and other business criteria useful by one or more of the subsystems of the analytics system 4006.

Figure 10:
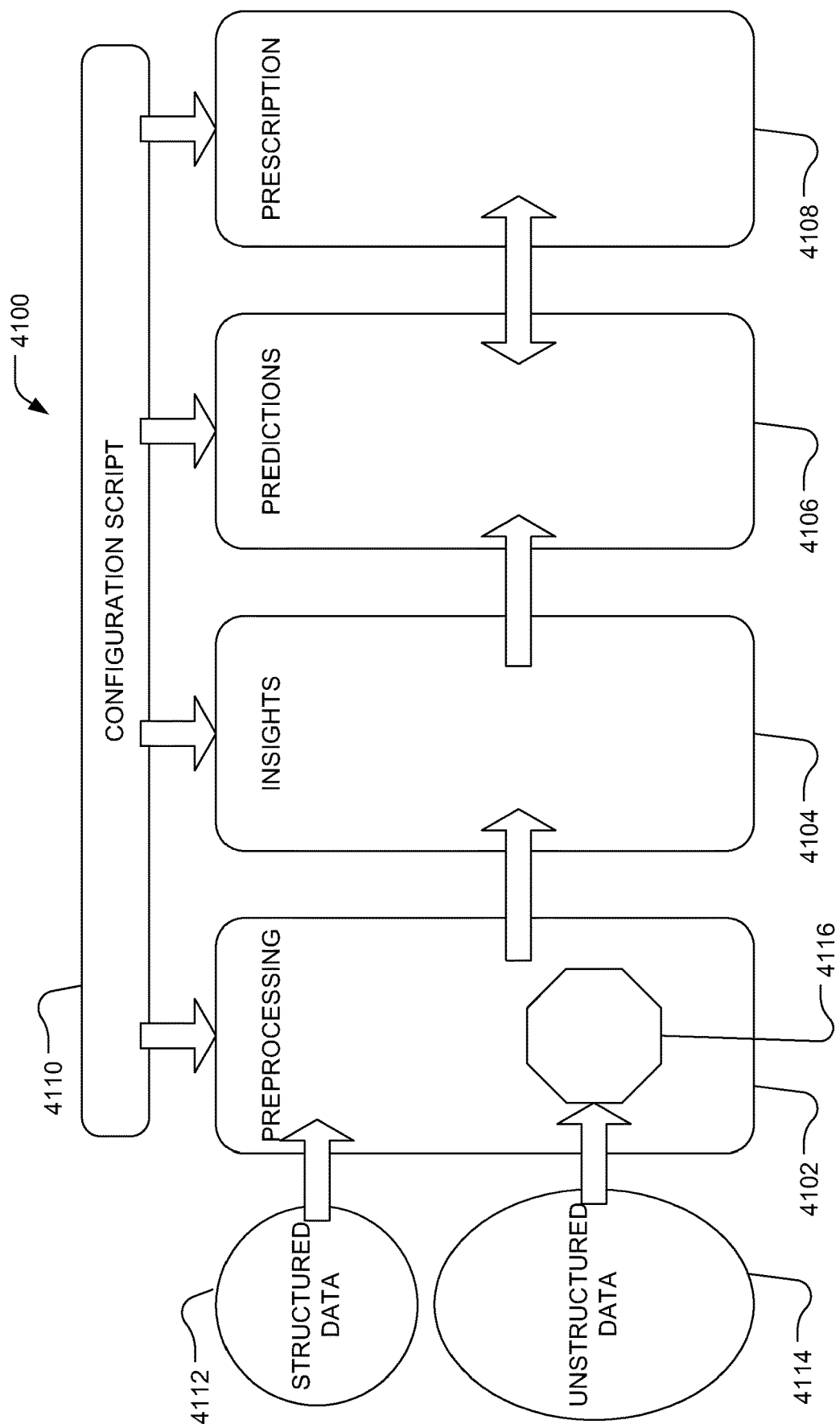
FIG. 10 and FIG. 11 include illustrations of exemplary analytics systems.

In an example, an analytics system includes a preprocessing subsystem, an insight subsystem (also referred to as a modeling subsystem), a prediction subsystem, and a prescription subsystem. For example, as illustrated in FIG. 10, an analytics system 4100 includes a preprocessing subsystem 4102, an insight subsystem 4104, a prediction subsystem 4106, and a prescriptions subsystem 4108. A configuration script 4110 is accessible by each of the subsystems 4102, 4104, 4106, and 4108. In addition, each of the subsystems 4102, 4104, 4106, and 4108 can be accessed through a user interface, through which a user can directly enter parameters and select options. The user interface may also access the configuration script 4110 to populate the user interface.

The configuration script 4110 can identify a set of variables including influencers and performance indicators. The identified influencers can include immutable influencers and mutable influencers. Each of the subsystems 4102, 4104, 4106, and 4108 can utilize the identified variables to perform their respective function. In addition, the configuration script 4110 can identify algorithms, models, methods, or processes, as well as parameters, inputs and data useful by such algorithms, models, methods, or processes for a particular subsystem.

In an example, the analytics system 4100 includes a preprocessing subsystem 4102 which accesses raw data sources and formulates a data set useful by other subsystems of the analytics system 4100. For example, the preprocessing subsystem 4102 can access structured data sources 4112 and unstructured data sources 4114. Structured data sources 4112 can include databases, tables, spreadsheets, calendars, delimited data or structured text files. The processing subsystem 4102 can access such structured data sources 4112 and using specified algorithms and methods, parse, clean or otherwise restructure the data 4112 for use by other subsystems within the analytics system 4100.

Further, the preprocessing subsystem 4102 can access unstructured data sources 4114. For example, the unstructured data sources can include narrative text, audio, image or video. A selected unstructured data source can be processed through an interpreter 4116 to provide structured data in a form that other subsystems of the analytics system 4100 can use. For example, an interpreter may be used to sample narrative text from websites or user comments to evaluate user sentiment. In another example, a preprocessing subsystem 4102 can use an interpreter 4116 to determine sentiment based on audio files, such as audio files generated from customer service phone calls. In a further example, an interpreter 4116 can be used to process a video file to analyze human emotion relative to variety of subjects.

In an example, the interpreter 4116 defines a variable or entity, extracts the value of the variable and associates the value with a time. An exemplary interpreter for analyzing narrative texts can include word frequency counting, associating a word frequency value with the date of the narrative writing. In another example, an interpreter for video or photo images may identify a mouth or other facial feature and fit a polynomial to the facial feature, associating the parameters of fit polynomial with a time stamp of the video or photos. In another example, the time to be associated with the fitted polynomial parameters can be a file date, or the interpreter or user can identify a time of year based on the background within the video image or photo.

In order to process data, the preprocessing subsystem 4102 can access the configuration script 4110. The configuration script 4110 can identify variables for which data is to be processed. In particular, the configuration script 4110 can identify a variable, a data source associated with the variable, the type of data source, an algorithm, method, or interpreter to use in analyzing the data source, other parameters associated with the algorithm, method, or interpreter, a format of data to be provided to other subsystems within the analytics system 4100, or any combination thereof. For example, the configuration script 4110 may identify a structured data source 4112, a method to use with the structured data source, the type of data source to be processed, and a variable, such as an influencer or performance indicator, to associate with the data source. The preprocessing subsystem 4102 performs extraction, transfer, and loading (ETL) functionality, including cleaning, removing duplicates, normalizing data, and aggregating the data for use by other subsystems.

In another example, the configuration script 4110 can identify a data source such as an unstructured data source 4114, the nature the data source (e.g., narrative text, audio, image, or video), an interpreter 4116 to process the data source, and parameters associated with the interpreter 4116, as well as a variable to associated with the output from the interpreter.

An insight or modeling subsystem 4104 of the analytics system 4110 can utilize the processed data and formulate a model associating influencers with performance indicators. For example, the insight subsystem 4104 can access data provided by the preprocessing subsystem 4102. In addition, the insight subsystem 4104 can access the configuration script 4110. The configuration script 4110 can provide an identity of variables, such as influencers and performance indicators. In addition, the configuration script 4110 can identify which modeling technique to use in developing a model to associate influencers with performance indicators, as well as parameters associated with the selected modeling technique. For example, the insight subsystem 4104 can be configured to implement a model using a modeling technique such heuristics, regression models, Markov chains, time series models, state space models, Bayesian models, neural networks, or any other appropriate model, or any combination thereof. The configuration script 4110 can select a particular modeling technique to use with a set of data and parameters associated with the selected modeling technique. For example, a neural net modeling technique may be specified in the configuration script 4110 and a number of nodes or node levels to be used in developing a neural net model associated with the selected data. In a further example, the model type can be a genetic algorithm and parameters associated with such a genetic algorithm can include population size or a crossover operator. In an additional example, the model type may be a polynomial fit and the parameter may be an order of the polynomial. Additional parameters that may be associated with modeling can include selecting a training set size or tests set size and specifying how the training set is selected such as randomly or a specified set. In a further example, a k-fold training may be specified as a parameter to the model subsystem.

In another example, more than one model type and associated parameters can be specified in the configuration script, along with selection criteria for selecting a model. For example, several models of the specified model types can be derived from the influencer and indicator data. One of the models can be selected based on selection criteria, such as a measure of accuracy or error.

Once the model is developed by the insight subsystem 4104, predictions about the performance indicators can be made by the prediction subsystem 4106. In particular, the prediction subsystem 4106 may access the model developed by the insight subsystem 4104, as well as data formulated by the processing subsystem 4102. The prediction subsystem 4106 can project values of the associated variables including influencers, such as mutable or immutable influencers, and performance indicators based on a model developed by the insight subsystem 4104.

The prediction subsystem 4106 can also access the configuration script 4110. The configuration script 4110 identifies variables, including the influencers and the performance indicators. In addition, the configuration script 4110 can include parameters useful by the predictions subsystem 4106, such as a time horizon for making projections, time granularity associated with the steps towards the time horizon, and other features or parameters. In particular, the time granularity may identify an increment of time and may be stated in specific time increments, such as a week, a month, quarterly, annually, etc. Alternatively, the length of increment may be consistent throughout the system and the time granularity can be expressed as a number of increments (e.g., 1, 2, or 3). The time horizon can be established as an endpoint to the prediction to be provided to a user, such as in 3 weeks, in 4 months, three quarters from now, or 5 years from now. In particular, the time horizon can be expressed as a number of the granular periods (e.g., 1, 2, 5, or 10). The time granularity and time horizon are not limited by the above examples and can include time periods and increments larger or smaller than the above examples.

Utilizing the prediction system 4106, a prescription subsystem 4108 can provide a suggested course of action based on suggested influencer values at future time periods. For example, when a performance indicator is predicted by the predictions subsystem of 4106 to violate a business criterion or rule, the prescription subsystem 4108 manipulates the future influencer values to determine a pathway for bringing the performance indicator in compliance with a business criteria or business rules. The prescription subsystem 4108 can access the configuration script 4110 to utilize the identified variables, such as influencers and performance indicators. In particular, the configuration script 4110 can identify mutable influencers that may be manipulated by the prescription subsystem 4108 to bring the performance indicator in compliance with business rules or business criteria. Further, the configuration script 4110 can identify an objective function or performance indicator about which to optimize. The configuration script 4110 can also identify an optimization routine and associated parameters to be utilized by the prescription subsystem 4108 for finding a set of future influencer values that provide a desirable course of action to bring the performance indicator in compliance with business rules of business criteria.

The configuration script 4110 can further include business criteria, thresholds, rules, functors, and other elements to configure one or more subsystems, such as the predictions subsystem 4106 or the prescription subsystem 4108. For example, upon developing a prediction, the prediction subsystem 4106 can identify performance indicators that do not conform to business criteria or business rules. For example, the prediction subsystem 4106 can identify those performance indicators that cross a threshold. In another example, the configuration script 4110 can identify a functor placing limits on the rate of change of a particular mutable influencer. In cooperation with the prediction subsystem 4106, the prescription subsystem 4108 can formulate a desired set of future influencer values that conform to the limits placed on the influencer value by the functor identified by the configuration script 4110.

In particular example, such an analytics system 4100 can perform analysis of data and utilizing the configuration script, can process the data through each subsystem to provide a desirable set of user actions as indicated by the prescribed influencer future values. The user actions can be displayed on a display device.

In a further example, the configuration script 4110 can identify other configuration scripts to be incorporated into the configuration script 4110. As such, previously developed configuration scripts that provide a desired function or have been tested individually can be implemented in the configuration script 4110.

The functionality, such as data processing or extraction, transfer and load (ETL), modeling, prediction, or prescription is illustrated as being associated with a particular subsystem or module. Alternatively, the functionality can be split between subsystems or modules or two functions can be associated with the same subsystem or module. As used herein, separate logical modules providing, in combination, a function such as extraction transfer mode (ETL) are discussed a single module. Further, a logical module providing more than one of the above-described functionalities is treated as two separate subsystems or modules or a single logical module encompassing two functional modules or subsystems.

Figure 11:
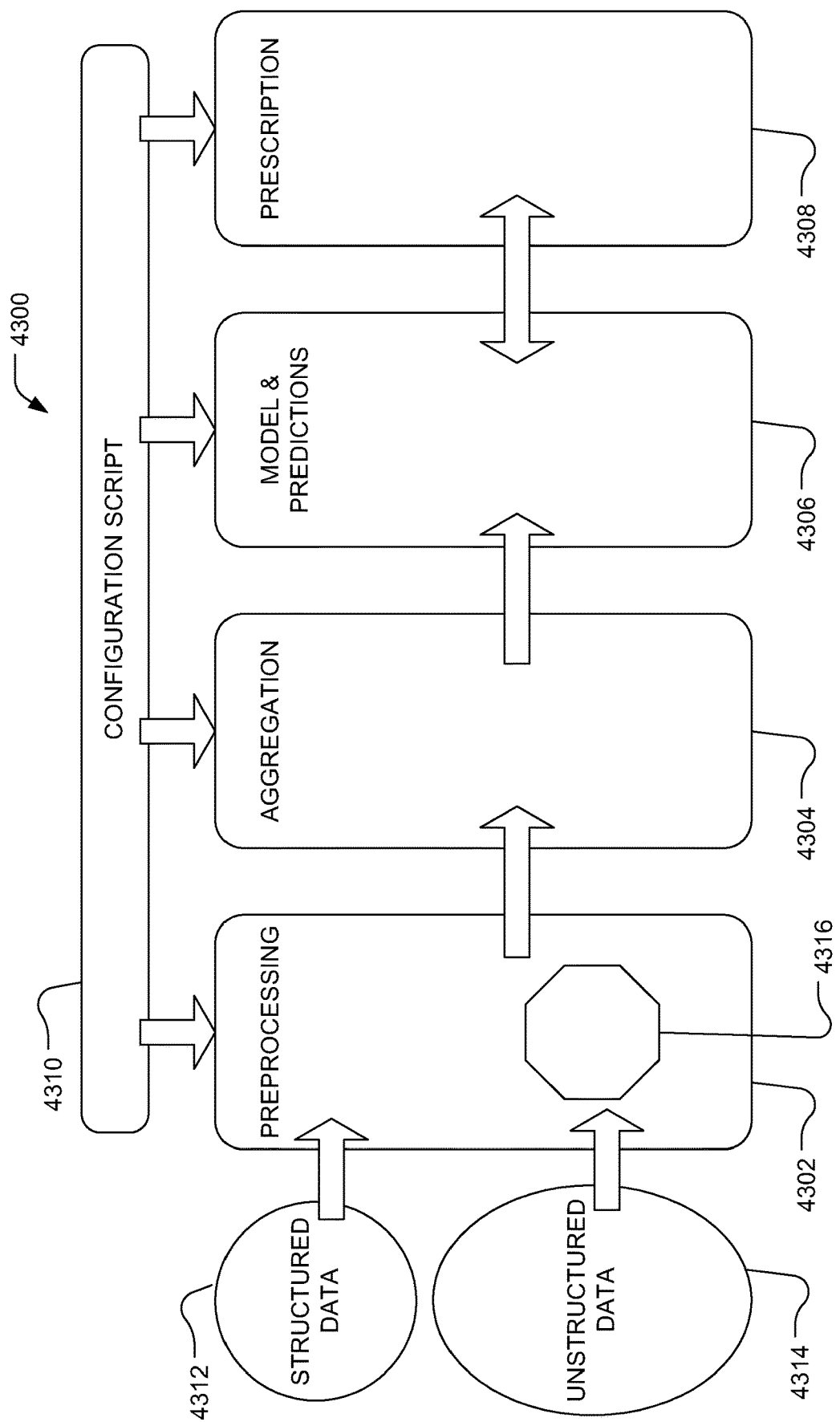

For example, FIG. 11 illustrates an analysis system 4300 including a processing subsystem 4302, an aggregation subsystem 4304, a modeling and predictions subsystem 4306, and a prescription subsystem 4308. A configuration script 4310 is in communication with each of the subsystems 4302, 4304, 4306, and 4308 of the analytics system 4300. In addition, each of the subsystems 4302, 4304, 4306, and 4308 can be accessed through a user interface, through which a user can directly enter parameters and select options. The user interface may also access the configuration script 4310 to populate the user interface.

As illustrated, the preprocessing subsystem 4302 accesses structured data 4312 and unstructured data 4314 and incorporates an interpreter 4316. The aggregation subsystem 4304 performs additional data processing functions, for example, aggregating data having a defined time granularity and determining derived variables based on expression. In combination, the preprocessing subsystem 4302 and the aggregation subsystem 4304 perform the extraction transfer load (ETL) functions useful for an analytic system 4300. As such, the preprocessing subsystem 4302 and the aggregation subsystem 4304 can be treated as a single subsystem or can be treated as two separate subsystem.

A model and predictions subsystem 4306 performs both modeling and prediction functionality and as such, can be a logical subsystem that incorporates two functional subsystem: one for modeling and one for predictions. In such an example, the model and predictions subsystem 4306 can access the configuration script to retrieve both scripting associated with modeling and scripting associated with predictions.

Figure 12:
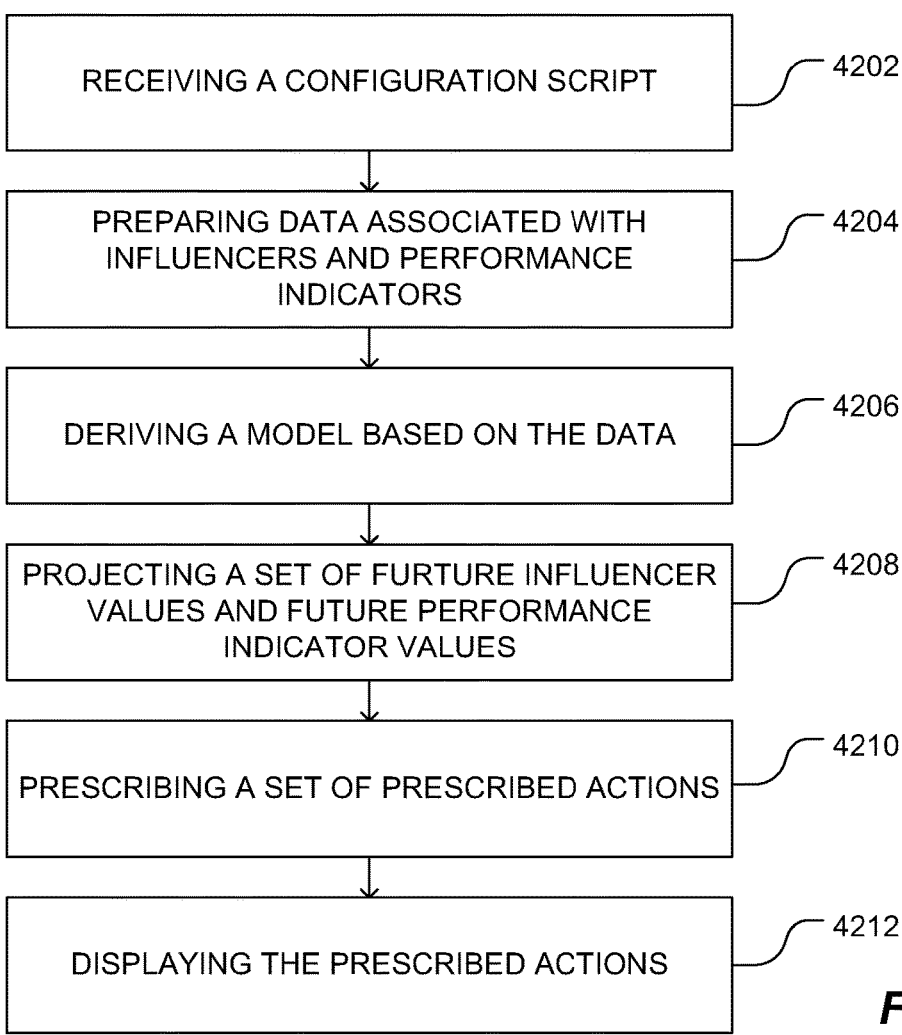
FIG. 12 includes a flow diagram illustrating an exemplary method for performing analytics, including prediction and prescription.

As illustrated in FIG. 12, an exemplary method 4200 includes receiving a configuration script 4202. The configuration script can identify elements useful by one or more of the subsystems of an analytic system. For example, the configuration script can identify variables, such as mutable influencers, immutable influencers, or performance indicators. Further, the configuration script 4202 can include identification of algorithms and associated parameters for use by each of the subsystems. For example, the configuration script can include identification of the data source, and the variable to be associated with the data source. In another example, the configuration script can include a selected model type as well as parameters to be used in developing a model of the selected model type. In another example, the configuration script can include a time horizon or time granularity to be applied to a prediction. In a further example, the configuration script can include an optimization algorithm or an objective function.

Based on information provided by the configuration script, data associated with influencers and performance indicators can be prepared, as illustrated at 4204. For example, a preprocessing subsystem can access a configuration script to determine a data source, the nature the data source, algorithms or interpreters to be utilized in accessing the data source, or which variable to associate with data acquired from the data source.

Utilizing the processed data, a model can be derived based on the data, for example, using an insight or modeling subsystem, as illustrated at 4206. In particular, the insight subsystem can access the configuration script to retrieve, identification of influencers and performance indicators, a model type and parameters associated with formulating or developing a model of the selected model type. The insight subsystem can derive the model utilizing the information of the configuration script.

As illustrated at 4208, a set of future influencer values and future performance indicator values can be projected, for example, by a prediction subsystem. The prediction subsystem can access a configuration script to identify influencers and performance indicators. In addition, the predictions subsystem can access the configuration script to retrieve a time horizon and time granularity to be associated with the projected future influencer values and future performance indicator values.

As illustrated at 4210, a set of prescribed actions can be prescribed, for example, by a prescription subsystem. The prescription subsystem can access a configuration script to identify mutable influencers, as well as performance indicators. In addition, the prescription subsystem may access the configuration script to identify an objective function, optimization method, and parameters associated with the optimization method. Further, the prescription module may access the predictions subsystem and iteratively perform predictions based on the prescribed future influencer values.

Once a set of prescribed future influencer values is determined, the prescribed influencer values may be translated into prescribed actions and displayed, as illustrated at 4212. For example, the future influencer values may directly identify user actions to be implemented to maintain the performance indicators in compliance at a future date. Alternatively, the influencer values may be translated through an algorithm into select user actions that can be implemented by a business. Such user actions can be displayed, as illustrated 4212.

In an embodiment, the configuration script can take the form of a domain-specific language (DSL). In an example, the script can be a program. In the example below, the configuration script shares similarity with programming languages, such as C++. However, a configuration scripting syntax can be configured to emulate the syntax of other programming languages or follow a unique syntax.

In an example, the configuration script identifies variables for use by the analytics system. For example, the configuration script can identify variables, such as mutable influencers. In another example, the configuration script can identify immutable influencers, mutable influencers, performance indicators, or a combination thereof. The configuration script can include a section marker, for example, identified with a leading "#" marker. For example, a mutable variable ("material") may be identified as:

mutables
material;

Where the influencer is constrained, such as with a set limit or with a functor, the influencer may be characterized by the constraint.
mutables
engineering_staff=m*t+b
m>=−1
m<=10
b>=1;
engineering_hours<=1000;

A variable can be a continuous variable, an integer variable, or a categorical variable, among others. As such, a constraint associated with the variable can be expressed in a manner consistent with the variable's nature. In particular, a constraint section can define constraints or business rules associated with variables other than mutable influencers.
//identifies the constrain section
contraints
// a continuous variable with a constraint
burn_rate<=1000;
// a categorical variable, where !@ is NOT IN
shipping !@ {truck, train};

Such constraints can include functor constraints (constraint functions of time or other variables) having a linear or higher order expression in terms of time or optionally in terms of other variables. As such, a constraint relationship between a variable and time or between two variables can be established. For example, three variables may be constrained so that their sum cannot exceed a fixed value. Further, the constraint section or a separate business rules section may identify thresholds or other boundaries that if crossed by a performance indicator indicate a problem, error, or undesirable condition.

The configuration script can further include sections specific to subsystems within the analytics system, for example, identifying algorithms to be used by the subsystem and specifying parameters associated with the algorithm. In an example, the configuration script can identify a data source, an associated algorithm for processing the data source and the variable to associate with the data source. The data source can be structured or unstructured.
//identifies a data section
data
//identifies a structured data source, associated variable, and parsing method
data_source_1="\\data_folder\data_file.txt"
engineering_staff
tab_delimited;
//identifies an unstructured data source, associated variable, associated type, interpretation method, and a parameter associated with the interpretation method
data_source_2="\\data_folder\interview.mp3"
customer_sentiment
audio_mp3
sentiment_module_2
p=3;

In another example, the configuration script can identify a model for use by a modeling subsystem or an insight subsystem. For example, the configuration script can include a model section and specify a model algorithm and associated parameters.
//identifies the model section
model
//identifies the model and associated parameters
nueral_net_module 2
level=3

More than one model can be identified. In addition, selection criteria can be identified for selecting between models for the system or for a particular performance indicator. Exemplary selection criterion can include accuracy or error rates, deviations, $R^2$ factors, or other criterion.

In a further example, the configuration script can specify parameters for a prediction, such as a time horizon or a time granularity. The time granularity can specify a period (e.g., days, weeks, months) or if the period is consistent throughout the system, can specify a number of periods (e.g., 1, 2, and 5). The time horizon can specify the last period (e.g., 5 for the fifth period). Alternatively, the time horizon can specify a specific time. For example, the configuration script can provide a predictions section.
//identifies the prediction section
prediction
//identifies a time granularity
granularity=weeks;
//identified a time horizon
at
5; // Weeks #5 (from "now").

In a further example, the configuration script can provide a section for prescriptions. The prescriptions section can identify an optimization routine, a performance indicator around which to optimize or an objective function, or a time horizon or endpoint.
//identifies an prescriptions section
prescription
//identifies a performance indicator around which to optimize
profit;
at
5; // Week #5 (from "now").

When a time horizon is specified for both the predictions subsystem and prescriptions subsystem, the time horizon specified for the prescriptions subsystem can take precedent during the prescriptions operation. Alternatively, the time horizon specified for the predictions subsystem can take precedent.

In an additional example, the configuration script can incorporate other configuration scripts. For example, previously developed scripts can be incorporated to simplify operations and reuse established scripts.

```
//file inclusions
# include "other_script.pal"
```

The analytics system can further include a parser to assist with subsystem access to the items of the configuration script. In an example, the parser can construct objects accessible to the various subsystems.

The analytics system, associated subsystems, configuration script, parser, and data sources can be implemented on one or more computational devices connected through various communications protocols. In particular, access between a subsystem and another subsystem can be facilitated by direct communication or by communication through data storage accessible to both subsystems. Similarly, access from a subsystem to the configuration script can be facilitated by direct access to the script or to data objected parsed from the configuration script.

Figure 13:
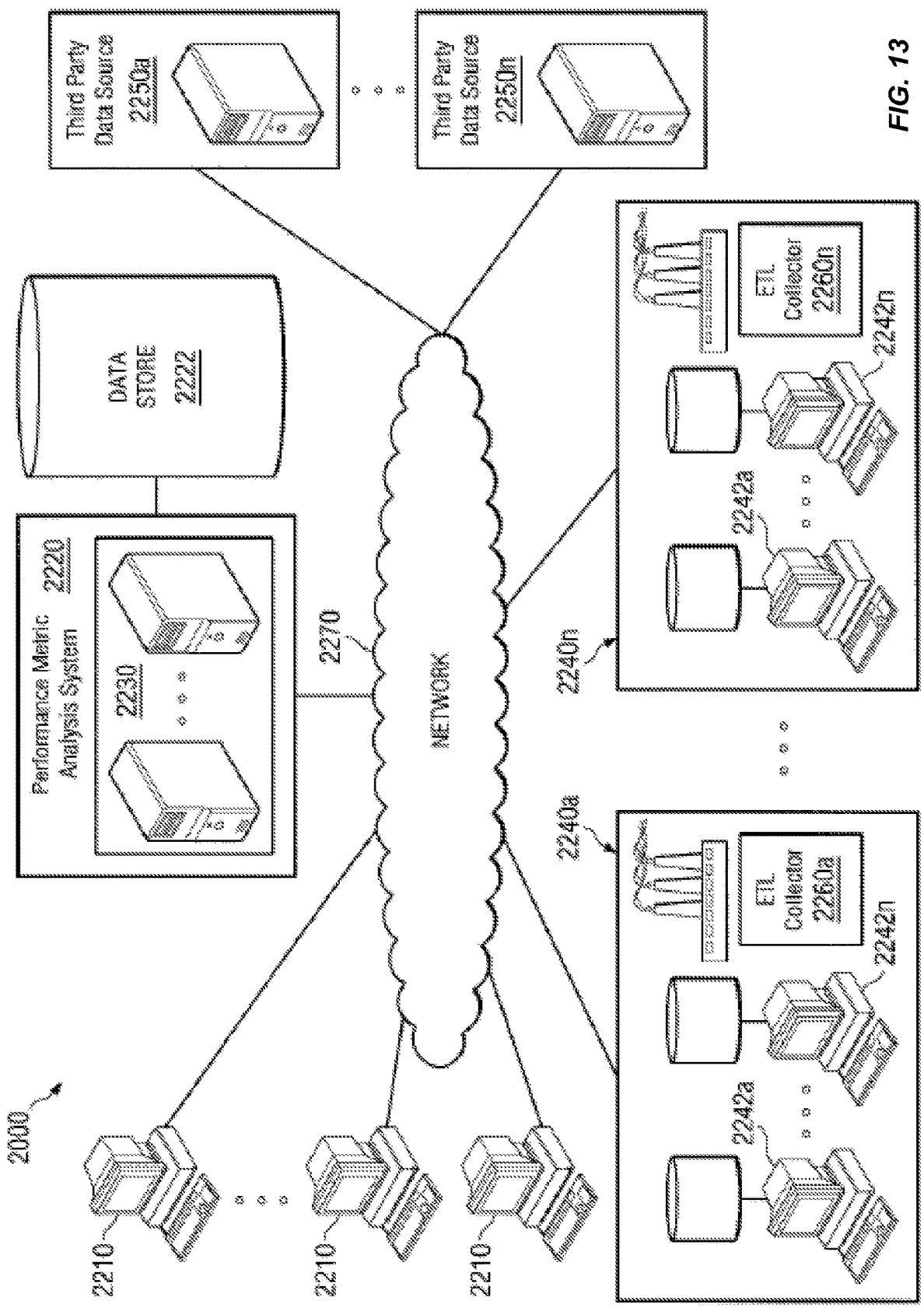
FIG. 13 is a block diagram illustrating an embodiment of a topology that can be used in conjunction with an implementation of embodiments of the present invention.

While a variety of system topologies can be used to implement the above described system, a topology, such as the topology illustrated in FIG. 13 can be used to implement embodiments of the systems and methods. Topology 2000 comprises performance metric analysis system 2220 (including associated data store 2222) comprising one or more computer devices 2230. These computing devices 2230 can, for example, by organized as a cluster which can be a loosely or a tightly coupled cluster and include one or more load balancers (not shown). Performance metric analysis system 2220 (e.g. one or more of computing devices 2230) can be coupled through network 2270 to computing devices 2210 (e.g. computer systems, personal data assistants, kiosks, dedicated terminals, etc), one or more locations of an entity 2240 and one or more third party data sources 2250 operable to provide, for example, market data, benchmarking data, etc. Network 2270 can be for example, the Internet, a wide area network (WAN), a local area network (LAN) or any other type of conventional or non-electronic communication link such as mail, courier services or the like.

Generally speaking then, entity 2240 can be a business, non-profit, or other type of entity which implements a process. This process can, for example, be a business process which relates to the functionality or performance of the entity. As discussed above, for example, such business processes can comprise the implementation of customer service through a contact or call center, the implementation of transaction services, the management of supply or demand chains or other inventory management, the implementation of field services, the implementation and management of sales pipelines, etc.

No matter the type of processes implemented by the entity 2240 however, it can be useful to measure or otherwise analyze (including predicting, simulating, optimizing, etc.) the performance of such a process utilizing a performance metric, such as a KPI as discussed above. Accordingly, entity 2240 can desire to utilize and monitor these performance metrics related to these processes for a variety of reasons, including improving the performance of such processes, reducing the cost of implementing such processes, controlling the quality of such processes, preempting issues which can occur in the future with respect to these processes, substantially optimizing solutions to future problems and predicatively determine the effect of certain solutions to anticipated future problems, etc.

To that end, performance metric analysis system 2220 can gather data from entity 2240 or a third party data source 2250 to analyze such data to perform analysis on such data and can present an interface such that one or more users at computing devices 2210 can determine what analytics are utilized, the data used for these analytics, view, or affect the results, of such analytics, etc. Embodiments of such interfaces have been discussed previously herein.

More specifically, in one embodiment, performance metric analysis system 2220 can implement a set of analytics comprising at least predictive analytics, root-cause analytics, optimization and what-if simulation. Colloquially speaking, predictive analytics allows users (for example, associated with entity 2240) to identify and quantify problems (including opportunities) related to one or more performance metrics, root-cause analysis allows users to identify, quantify and rank influencers of performance metrics which can cause any upcoming problems, optimization can determine substantially optimum solution to preempt (or benefit from) any determined upcoming problems and what-if simulation allows a user to determine the effect of prescribed solutions on performance metrics.

To implement such analytics, performance metric analysis system 2220 can gather data directly or indirectly related to one or more performance metrics from entity 2240. Entity 2240 can have multiple locations 2240a, 2240n where each entity location 2240a, 2240n can comprise multiple servers or other types of computing devices 2242 which are involved in the implementation of the process by the entity 2240 or the storage of data involved with the implementation of the process. In some instances, entity locations 2240a, 2240n can have computing devices which run according to different operating systems or protocols, or which implement different types of applications or databases in conjunction with the process.

Each entity location 2240a, 2240n can have an associated ETL collector 2260 which is responsible for collecting appropriate data regarding the process or one or more associated performance metrics from various computing devices 2242 utilized in the implementation of the process or used to store data involved with the implementation of the process. ETL collector 2260 can send the data gathered at the corresponding entity location 2240 to the performance metric analysis system 2220 in response to a request from the performance metric analysis system 2220.

Thus, performance metric analysis system 2220 can, based upon one or more schedules, send out requests to each ETL collectors 2260 at each of the entity locations 2240a, 2240n and receive, in response, a set of data corresponding to that performance metric and that entity location 2240a, 2240n collected over a certain time period. This data can be stored in data store 2222. Analytics can then be performed by the performance metric analysis system 2220 using the data gathered from the entity locations 2240a, 2240n. The analytics performed by performance metric analysis system 2220 can be determined, at least in part, by a users interaction with an interface presented by performance metric analysis system 2220 and the results of the analytic performed can similarly be displayed to a user through the provided interface.

Not all of the various entities depicted in topology 2000 are necessary, or even desired, in embodiments, and that certain of the functionality described with respect to the entities depicted in topology 2000 can be combined into a single entity or eliminated altogether. The topology 2000 is therefore exemplary only and should in no way be taken as imposing any limitations on embodiments herein.

Each of the above disclosed methods can be performed on multiple systems. For example, the methods can include processing data streams from a file system. The file system can be distributed, particularly for large data sets. A method can be partitioned in such a way, that it can perform the operations on a partition or subset of the data. Such processing is particularly useful for unstructured data sources having large file size. The results of such processes can be combined in such a way that the result is identical to the method applied to a single data source being combined of all of the partitioned data.

In different embodiments, any presently-disclosed apparatus (or any presently disclosed computer product including a computer usable medium) can be configured or operative to any presently disclosed method or technique.

A computer program product, includes a computer usable medium having a computer readable program code non-transitorily embodied therein, said computer readable program code adapted to be executed to implement a method as described above. Computational subsystems can be implemented on the same computer or implemented as separate computers. The terms "module" and "subsystem" are used interchangeably herein.

In the present disclosure, certain routines for calculating data or displaying data may be carried out 'in accordance with' a certain factor—for example, influencer identifiers may be ordered or selected in accordance with magnitudes of one or more deviations. When a routine is carried out 'in accordance with' a certain factor or factors, the routine can also be carried out in accordance with one or more 'additional factors' or additional business rules (for example, displayed identifiers may be ordered both according to magnitudes of deviations as well as whether or not the influencer is designated as an 'external influencer' or a 'controllable influencer.'). In the present disclosure, the phrase 'in accordance with' (or 'according to') should be interpreted as 'at least in part in accordance with.'

As described above, "controllable influencers," "actionable influencers," and "mutable influencers" are analogous terms. In an example, an influencer can be a business input. For example, an influencer can be a measurable business input, such as a business input relating to an action, a business function, or other business relevant data. A key performance indicator can be a business output, such as a measurable indication of performance of a business function.

In a first aspect, a method of determining a set of prescribed actions includes receiving from a user a configuration script identifying a set of influencers, a set of performance indicators, a model type, a granularity, a target time, and a prescription method. The method further includes, using a modeling module, deriving a model of the model type based on data associated with the set of influencers and data associated with the set of performance indicators. The model associates the set of influencers with the set of performance indicators. The set of influencers includes a subset of actionable influencers. The method also includes, using a prediction module in communication with the modeling module, projecting a set of future influencer values associated with the set of influencers and projecting a set of future indicator values of the set of performance indicators at the target time using the model derived by the modeling module. The set of future influencer values has the granularity. The method can further include, using a prescription module in communication with the prediction module, prescribing using the prescription method and based on projecting using the model a set of prescribed actions associated with the subset of actionable influencers. The set of prescribed actions has the granularity. The method also includes displaying the set of prescribed actions.

In an example of the first aspect, the configuration script further identifies a data source and an interpretation method associated with the data source. For example, the method can further include, using a preprocessing module, preparing at least a portion of the data associated with the set of influencers or at least a portion of the data associated with the set of performance indicators using the data source based on the interpretation method associated with the data source. In an example, the modeling module is in communication with the preprocessing module. In another example, the data source is a narrative text source. In an additional example, the data source is an audio source. In a further example, the data source is a video source.

In another example of the first aspect and the above examples, the configuration script further identifies a constraint associated with a performance indicator of the set of performance indicators. For example, prescribing can include prescribing based on the constraint. In another example, the constraint is an inequality constraint. In an additional example, the constraint is categorical. In a further example, the constraint is a functor constraint.

In a further example of the first aspect and the above examples, the configuration script further identifies a constraint associated with an influencer of the set of influencers. For example, prescribing includes prescribing based on the constraint. In another example, the constraint is an inequality constraint. In a further example, the constraint is categorical. In an additional example, the constraint is a functor constraint.

In an additional example of the first aspect and the above examples, the configuration script further identifies an objective, and prescribing includes prescribing based on the objective. In another example, the objective is associated with a performance indicator of the set of performance indicators.

In a second aspect, a method of determining a set of prescribed actions includes receiving from a user a configuration script identifying a set of influencers, a set of performance indicators, a constraint associated with a constrained influencer of the set of influencers, a model type, a granularity, a target time, a prescription method, and an objective. The method further includes, using a modeling module, deriving a model of the model type based on data associated with the set of influencers and data associated with the set of performance indicators. The model associates the set of influencers with the set of performance indicators. The set of influencers includes a subset of actionable influencers. The method also includes, using a prediction module in communication with the modeling module, projecting a set of future influencer values associated with the set of influencers and projecting a set of future indicator values of the set of performance indicators at the target time using the model derived by the modeling module. The set of future influencer values has the granularity. In addition, the method includes, using a prescription module in communication with the prediction module, prescribing using the prescription method, based on the objective and based on projecting using the model subject to the constraint, a set of prescribed actions associated with the subset of actionable influencers.

The set of prescribed actions has the granularity. The method also includes displaying the set of prescribed actions.

In an example of the second aspect, the constraint is an inequality constraint. In another example of the second aspect, the constraint is categorical. In an additional example of the second aspect, the constraint is a functor constraint.

In a third aspect, a method of determining a set of prescribed actions includes receiving from a user a configuration script identifying a data source, an interpretation method associated with the data source, a set of influencers, a set of performance indicators, a constraint associated with a constrained influencer of the set of influencers, a model type, a granularity, a target time, a prescription method, and an objective. The method also includes, using a preprocessing module, preparing a portion of the data associated with the set of influencers or a portion of the data associated with the set of performance indicators using the data source based on the interpretation method associated with the data source. The method further includes, using a modeling module, deriving a model of the model type based on the data associated with the set of influencers and the data associated with the set of performance indicators. The model associates the set of influencers with the set of performance indicators. The set of influencers includes a subset of actionable influencers. The method also includes, using a prediction module in communication with the modeling module, projecting a set of future influencer values associated with the set of influencers and projecting a set of future indicator values of the set of performance indicators at the target time using the model derived by the modeling module. The set of future influencer values has the granularity. In addition, the method includes, using a prescription module in communication with the prediction module, prescribing using the prescription method, based on the objective and based on projecting using the model subject to the constraint, a set of prescribed actions associated with the subset of actionable influencers. The set of prescribed actions has the granularity. The method also includes displaying the set of prescribed actions.

In a fourth aspect, a computational system includes storage comprising a configuration script accessible by a modeling module, a prediction module, and a prescription module. The configuration script identifies a set of influencers, a set of performance indicators, a model type, a prediction time, and a prescription algorithm. The computational system further includes the modeling module to receive data associated with the set of influencers and data associated with the set of performance indicators and to derive a model of the model type associating the set of the influencers with the set of performance indicators and the prediction module communicatively coupled to the modeling module to receive the model associating the set of influencers with the set of performance indicators. The prediction module is to provide future indicator values associated with the set of performance indicators at the prediction time based on a set of influencer values associated with the set of influencers. The set of influencer values includes a set of present influencer values associated with the set of influencers and includes a projected set of future influencer values associated with the set of influencers. The computational system further includes the prescription module communicatively coupled to the prediction module to receive the future indicator values associated with the set of performance indicators and the set of influencer values associated with the set of influencers. The prescription module is to prescribe a set of prescribed actions based on prescription algorithm.

In an example of the fourth aspect, the computation system further includes a preprocessing module to determine at least a portion of the data associated with the set of influencers or at least a portion of the data associated with the set of performance indicators based on a data source, wherein the configuration script is accessible by the preprocessing module. The configuration script identifies the data source and an associated influencer of the set of influencers or an associated performance indicator of the set of performance indicators. For example, the configuration script further identifies a processing method associated with the data source. The preprocessing module is to determine the at least a portion of the data using the processing method. In an example, the data source is narrative text. In another example, the data source is an audio source. In an additional example, the data source is a video source.

In another example of the fourth aspect and the above examples, the configuration script further identifies a constraint associated with a performance indicator of the set of performance indicators. In an example, the prescription module is to prescribe based on the constraint. In another example, the constraint is an inequality constraint. In a further example, the constraint is categorical. In an additional example, the constraint is a functor constraint.

In a further example of the fourth aspect and the above examples, the configuration script further identifies a constraint associated with an influencer of the set of influencers. For example, the prescription module is to prescribe based on the constraint. In an example, the constraint is an inequality constraint. In another example, the constraint is categorical. In a further example, the constraint is a functor constraint.

In an additional example of the fourth aspect and the above examples, the configuration script further identifies an objective and the prescription module is to prescribe based on the objective. For example, the objective is associated with a performance indicator of the set of performance indicators. In another example, the objective is associated with an objective function.

In a fifth aspect, a computational system includes storage comprising a configuration script accessible by a preprocessing module, a modeling module, a prediction module, and a prescription module. The configuration script identifies a data source, a processing method associated with the data source, a set of influencers, a set of performance indicators, a model type, a prediction time, a prescription algorithm, and an objective. The computation system further includes the preprocessing module to determine at least a portion of data associated with the set of influencers or at least a portion of data associated with the set of performance indicators based on a data source in accordance with the processing method. The computation system also includes the modeling module to receive the data associated with the set of influencers and the data associated with the set of performance indicators and to derive a model of the model type associating the set of the influencers with the set of performance indicators. The computation system further includes the prediction module communicatively coupled to the modeling module to receive the model associating the set of influencers with the set of performance indicators. The prediction module is to provide future indicator values associated with the set of performance indicators at the prediction time based on a set of influencer values associated with the set of influencers. The set of influencer values includes a set of present influencer values associated with the set of influencers and includes a projected set of future influencer values associated with the set of influencers. The computation system also includes the prescription module communicatively coupled to the prediction module to receive the future indicator values associated with the set of performance indicators and the set of influencer values associated with the set of influencers. The prescription module is to prescribe a set of prescribed actions based on prescription algorithm and the objective.

In an example of the fifth aspect, the objective is associated with a performance indicator of the set of performance indicators.

In another example of the fifth aspect and the above examples, the objective is associated with an objective function.

Note that not all of the activities described above in the general description or the examples are required, that a portion of a specific activity may not be required, and that one or more further activities may be performed in addition to those described. Still further, the orders in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A computational system comprising:
    storage comprising a configuration script accessible by a modeling module, a prediction module, and a prescription module, the configuration script identifying a set of influencers, a set of performance indicators, a model type, a granularity, a target time, a prescription method, and a functor constraint associated with an influencer of the set of influencers;
    the modeling module comprising a processor configured to receive data associated with the set of influencers and data associated with the set of performance indicators and to derive a model of the model type associating the set of the influencers with the set of performance indicators, the set of influencers including a subset of actionable influencers;
    the prediction module communicatively coupled to the modeling module and comprising a processor configured to receive the model associating the set of influencers with the set of performance indicators, to project a set of future influencer values associated with the set of influencers and to project a set of future indicator values of the set of performance indicators at the target time using the model derived by the modeling module, the set of future influencer values having the granularity;
    the prescription module communicatively coupled to the prediction module and comprising a processor configured to receive the future indicator values associated with the set of performance indicators and the set of influencer values associated with the set of influencers, to prescribe, using the prescription method constrained by the functor constraint and based on the projecting using the model, a set of prescribed actions associated with the subset of actionable influencers, the set of prescribed actions having the granularity; and
    a display to display the set of prescribed actions.

2. The system of claim 1, further comprising a preprocessing module, the preprocessing module comprising a processor configured to determine at least a portion of the data associated with the set of influencers or at least a portion of the data associated with the set of performance indicators based on a data source, wherein the configuration script is accessible by the preprocessing module, the configuration script further identifying the data source and an associated influencer of the set of influencers or an associated performance indicator of the set of performance indicators.

3. The system of claim 2, wherein the configuration script further identifies a processing method associated with the data source, the preprocessing module to determine the at least a portion of the data using the processing method.

4. The system of claim 2, wherein the data source is narrative text.

5. The system of claim 2, wherein the data source is an audio source.

6. The system of claim 2, wherein the data source is a video source.

7. The system of claim 1, further comprising a user interface accessible to the modeling module, the prediction module, and the prescription module.

8. The system of claim 7, wherein the user interface is to access the configuration script to populate the user interface.

9. The system of claim 1, wherein the configuration script further identifies an indicator constraint associated with a performance indicator of the set of performance indicators.

10. The system of claim 9, wherein the prescription module is configured to prescribe based on the indicator constraint.

11. The system of claim 9, wherein the indicator constraint is an inequality constraint.

12. The system of claim 9, wherein the indicator constraint is categorical.

13. The system of claim 9, wherein the indicator constraint is a functor constraint.

14. The system of claim 1, wherein the configuration script further identifies a second constraint associated with an influencer of the set of influencers.

15. The system of claim 14, wherein the prescription module is configured to prescribe based on the second constraint.

16. The system of claim 14, wherein the second constraint is an inequality constraint.

17. The system of claim 14, wherein the second constraint is categorical.

18. The system of claim 1, wherein the configuration script further identifies an objective, and wherein the prescription module is to prescribe based on the objective.

19. The system of claim 18, wherein the objective is associated with a performance indicator of the set of performance indicators.

20. The system of claim 18, wherein the objective is associated with an objective function.

* * * * *